United States Patent [19]
DeGroat et al.

[11] 3,795,765
[45] Mar. 5, 1974

[54] ALTERNATE ANALOG ENCODING METHOD AND APPARATUS

[75] Inventors: Paul H. DeGroat, Webster; Allan J. Bell, Fairport, both of N.Y.; King Y. Cheng, Tustin, Calif.

[73] Assignee: Xerox Corporation, Stamford, Conn.

[22] Filed: Dec. 29, 1971

[21] Appl. No.: 213,697

[52] U.S. Cl. .................. 178/6, 178/68, 178/DIG. 3, 179/15.55 R

[51] Int. Cl. .............................................. H04b 1/66

[58] Field of Search.......... 178/DIG. 3, 6.6 R, 68, 6; 179/15.55 R

[56] References Cited

UNITED STATES PATENTS

| | | | |
|---|---|---|---|
| 3,678,194 | 7/1972 | Orrell | 178/68 |
| 3,538,246 | 11/1970 | Macouski | 178/DIG. 3 |
| 3,614,308 | 10/1971 | Iwai | 178/DIG. 3 |

*Primary Examiner*—Howard W. Britton

[57] ABSTRACT

This invention relates to an analog encoding method, whereby the polarity of a train of video signal waves are alternated to compress the bandwidth of the video signals before transmission, and to an alternate analog encoding apparatus which includes means for alternating the polarity of a train of black and white threshold level video signals to compress the bandwidth of the video signals, and means for transmitting the compressed black, white, and gray video signals in an analog form. This invention also relates to an alternate analog decoding apparatus which decodes and recovers the white, black, and gray video signals.

7 Claims, 5 Drawing Figures

ALTERNATE ANALOG ENCODING METHOD AND APPARATUS

This invention relates to a method of and an apparatus for encoding video signals for transmission over a bandwidth limited transmission path in general, and in particular, an improved method of and apparatus for encoding video signals into a form which preserves the gray scale video information while providing a bandwidth compression and a high resolution on white/-black video signal transitions.

BACKGROUND OF THE INVENTION

In telecommunication systems in general, and a facsimile transmission systems, in particular, the speed with which information can be transmitted is largely dictated by the bandwidth limitation of the transmission medium. In the case of facsimile transmission systems, the voice grade bandwidth limitation of four Kilohertz or less imposed by the telephone transmission lines sets the upper limit on the rate or speed of the data transmission. In maximizing the transmission speed, the bandwidth of the input signals is usually compressed within the framework of the well known Nyquist criteria.

Typically, the bandwidth compression has entailed quantization of the analog input signal into a digital signal and encoding of the digitalized signal into a multilevel digital signal. As applied to facsimile transmission systems, the input video signal is quantized into two level digital signals which carry the black and white level video information, and the two level digitalized signal is encoded into a three level digital signal to provide two-to-one bandwidth compression. In such systems, the gray scale video information is usually treated either as white or black in the process of digitalization of the analog video signals and accordingly only the black and white video information is transmitted. There are other facsimile systems which provides means for transmitting and receiving gray scale video information. But they tend to be rather complex and expensive.

SUMMARY OF THE INVENTION

An object of the present invention is to provide an analog encoding scheme which enhances the over-all quality of the facsimile copies.

Another object of the present invention is to provide an analog encoding scheme which preserves the gray scale analog information.

A further object of the invention is to provide an analog encoding scheme which preserves the gray scale analog information, while at the same time, providing a bandwidth compression.

Still another object of the invention is to provide an improved analog encoding scheme in a facsimile transmission system which preserves the gray scale analog information while providing a high resolution on the rapid white/black signal transitions.

The foregoing and other objects of the invention are achieved according to the present invention by alternating the polarity of the black and white threshold level video signal waves to provide bandwidth compression. A feature of the present invention is in the provision of means for clipping black (or white) level portions of the video signal waves at certain adjustable threshold levels while reducing the other, that is, white (or black) threshold levels to a ground level potential to enhance the black and white signal resolution. Afterwards, the clipped and forced video signal waves are encoded into multilevel signals to compress their bandwidth. In compressing the bandwidth, the gray scale information of the video signal ranging between the black and white threshold is retained in its original analog form and transmitted as such along with the black and white portions of the video signals. In the case where a two-to-three level encoding scheme is used, a two-to-one bandwidth compression is obtained by alternating the polarity of the video signal from which either black or white level threshold has been clipped and the other has been forced to a ground level potential.

The foregoing and other objects and features of the present invention will be understood more clearly from the following detailed description of the illustrative embodiments of the present invention, in conjunction with the accompanying drawings, in which.

DETAILED DESCRIPTION OF THE PREFERRED EMBODIMENTS OF THE INVENTION

Figure 1:
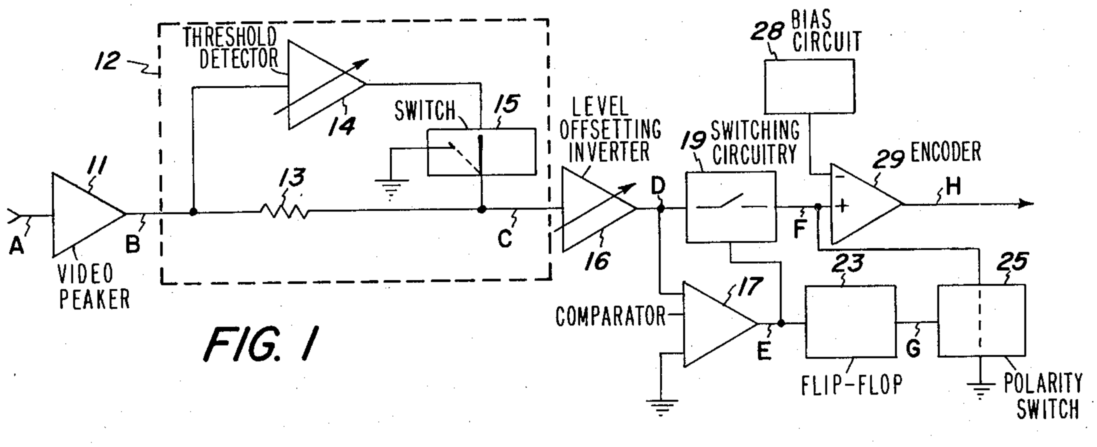
FIG. 1 shows an alternate analog encoding apparatus of the present invention in a block diagram form.
Figure 2:
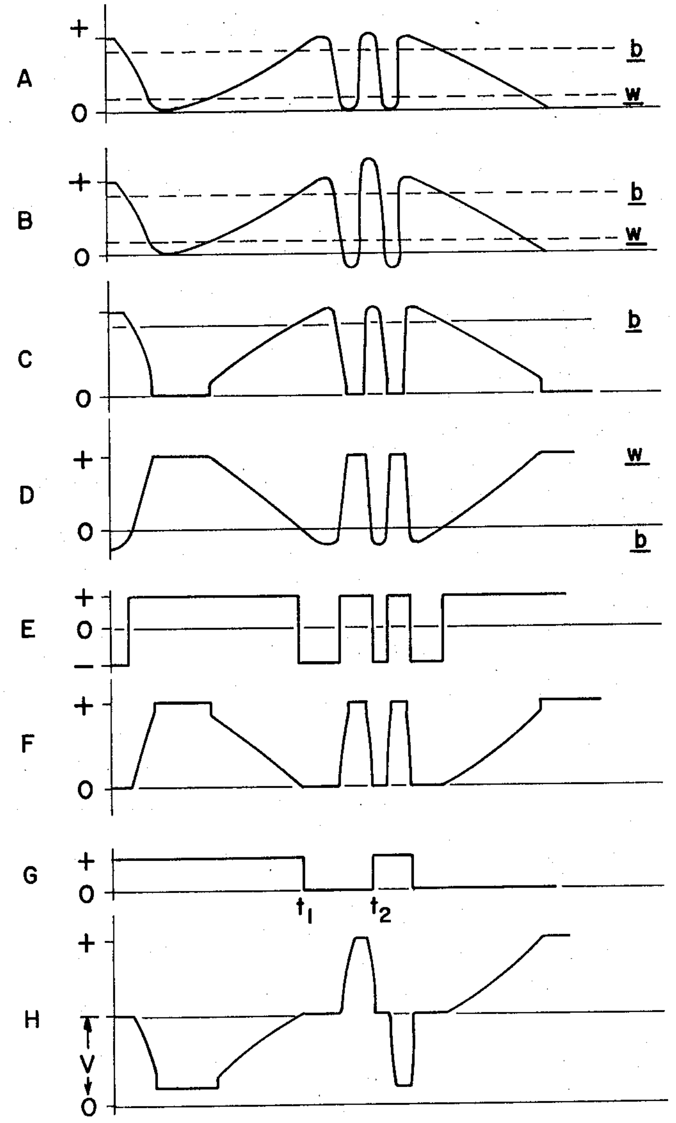
FIG. 2 shows the waveforms at the various points in the alternate analog encoding apparatus shown in FIG. 1.

Referring to FIGS. 1 and 2, the waveform A shows a portion of a video signal input applied to the present apparatus. The input is in the form of an alternating wave ranging between certain maximum and minimum positive voltage amplitudes. Such a wave form is obtained by a suitable conventional optical means (not shown) which converts the whole spectrum of the optical information of printed matters and the like into an electrical signal wherein the black portions are represented by the high amplitude and the white portions by the low amplitude, and the wide spectrum of the gray scale video signal is represented by the portions of the waveform ranging between the high and the low amplitudes. According to the conventional approach, the black and white signals are transmitted and gray scale information is generally disregarded. This is not the case with the present invention.

In accordance with an aspect of the present invention, as illustrated by the waveforms in FIG. 2, the high amplitude or black portions of the video signal are clipped off at a selected threshold level, $b$ and low amplitude or white portions of the video signals below a selected threshold level, $w$ are reduced or forced to a ground potential as shown by the waveforms in FIG. 2. The clipped and reshaped waves are then alternately inverted in a manner as described in detail below to compress the bandwidth of the video signal prior to transmission, preserve the gray scale video information, and provide a high level resolution on the black/-white transition. Thus more specifically referring to the wave forms in FIG. 2, off-white or gray background or noise below a certain threshold level, $w$, of the original which approaches white and which can be treated as white without losing video information content is transmitted as white signals and transmitted as such. Similarly, a range of dark gray above a certain level *b* which approaches black and which can be treated as black without losing video information content is transmitted as such. The black and white threshold levels, *b* and *w*, are adjustable and their optimal settings are largely dependent upon the quality of the paper or the level of off-white and dark gray that can be treated as white and black without adversely affecting the quality and content of the video information being transmitted. The threshold levels are set so that a good facsimile copy of the original can be obtained at the receiver.

As shall be seen from further descriptions below, the threshold clipping also provides timing signals used in encoding process. The present invention as generally described is implemented in a two-to-three level encoding process providing two-to-one bandwidth compression as follows.

Referring to FIG. 1, the analog video signal in the form of an alternating wave A, as shown in FIG. 2, is applied to a video peaking filter circuitry 11. The circuitry 11 is of a design which accentuates the maxima and minima of the waves as shown by the waveform B (FIG. 2). This accentuates the transition between the white and black video signals, and thus provides high resolution of white/black transitions. The peaking is in effect accomplished by accentuating the video components at high frequencies. This is seen by comparing the high frequency components of the video input waveform A with those of the output waveform B in FIG. 2.

The portions of video signals which fall below white threshold level *w* is reduced to a ground or zero potential as shown by the waveform C using a circuitry 12. The circuitry 12 may be comprised of a coupling impedance 13 which passes the peaked signal wave B therethrough to the next stage without change so long as the amplitude of the video signals is above the white threshold level *w*. The circuitry 12 is also comprised of a series network of an amplitude detecting circuit 14 and a normally open switching circuit 15, shunted across the coupling impedance 13. The amplitude detecting circuit 14 and the switching circuit 15 are so designed that the detecting circuit 14 maintains the switching circuit 15 in open position so long as the amplitude of the output wave B from the peaking circuit 11 exceeds the minimum threshold level *w*. But when the output of the peaking decreases below the white threshold level *w*, the detecting circuit 14 detects it and actuates the switching circuit 15 and shunts the input to the next stage to the ground, via the dotted line. As indicated by an arrow shown through the amplitude detecting circuit 14, the threshold level can be raised or lowered as necessary to optimize the suppression of background noise.

The output wave form C from the white level adjusting circuitry 12 is then applied to an invert and offset circuitry 16 to obtain the wave form D as shown. The circuitry 16 is of a design that inverts and offsets the output of the white level adjusting circuitry 12 so that the black threshold level *b* is established at zero DC voltage. The offset and inverted wave D is then applied to a comparator circuitry 17 which switches its output to a negative state from a positive voltage as shown by the wave form E when the video output from the invert and offset circuitry 16 falls below zero volts DC. In this manner, the comparator circuitry 17 marks zero crossings of the output wave D of the invert and offset circuitry 16 and generates a train of square E which marks points in time at which the video signal crosses the black threshold.

The output of the invert and offset circuitry 16 is applied also to a switching circuitry 19 which may include field effect transistors operatively connected to provide a switching function. The switching circuitry 19 is actuated by the output square wave E of the comparator 17 during the time intervals when the square waves are at the higher of its two amplitude states. When actuated the switching circuitry 19 closes and applies the output of the invert and offset circuitry to an encoder 21. This occurs during the successive time intervals of the video signal wave D when the video signal has positive value. In this manner, portions of the video signal wave from the output wave D of the invert and offset circuitry 16 which exceed the black threshold, *b* are applied to the encoder 21 and those falling below the black threshold level, *b*, are clipped off. The level of the clip-off can be adjusted at a suitable level to optimize the transmission quality by adjusting the invert and offset circuitry 16 and the comparator circuitry 17 such that the clipping occurs at proper points in time as marked by the output wave E of the comparator.

The encoder 21 is an encoding amplifier of a type which changes the polarity of its output in response to an external command signal in the following manner. The output of the comparator circuitry 17 is used to drive a flip-flop circuitry 23 that halves the repetition rate of the output E of the comparator 17, as shown by the waveform 6 in FIG. 2. The output wave G of the flip-flop circuitry 23 is used to drive a polarity switch circuitry 25. In response the polarity switch 25 commands the encoder 21 so that the encoder converts the two level wave F from the output of the switching circuitry 19 into a three level output by inverting every other wave as shown by the wave form H. In this way the video white/black excursions are inverted alternately to form three level white/black/white as shown by the waveform H.

It is important that the maximum amplitudes of the opposite waves of the three level output H is precisely matched. Lack of accuracy in this regard results in a distortion of the gray scale information. The matching is accomplished by using circuit elements of certain precise values in the encoder 21. In response the encoder offsets its three level output at a DC voltage and centers its output at this voltage as shown in the wave form H.

Figure 3:
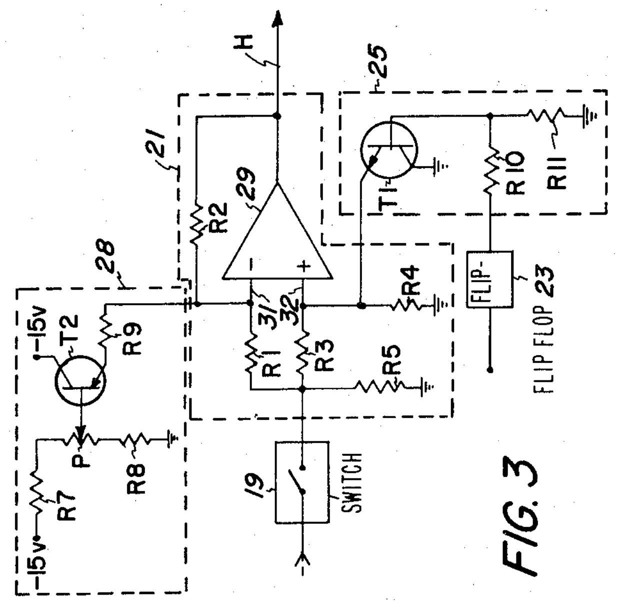
FIG. 3 shows a preferred embodiment of the encoder in the present apparatus which converts two level signals to three level signals.

FIG. 3 illustrates a preferred embodiment of a unique design which provides the aforementioned functions of the encoder 21, switch 25, and bias circuitry 28. The encoder is comprised of an operational amplifier 29 and resistors R1–R5. The resistor R1 acts as the input resistor whereas R2 acts as the feedback resistor, as is the case with the usual operational amplifier. Resistors R1 and R2, and the amplifier 21 are operatively connected so that normally it does not invert the polarity of its input when the noninverting terminal 30 is maintained at a certain DC voltage level established by the resistors R3, R4, and R5 of suitable magnitudes connected as shown. But it inverts when the non-inverting terminal is effectively grounded. This happens when transistor T1 of the switch 25 connected in a common collector configuration in conjunction with resistors R10 and R11 is actuated by the output of flip-flop circuitry 23. As shown by the waveforms F, G and H and as described above, the non-inverting terminal is grounded when the output wave G of the flip-flop circuitry applies a positive DC voltage. This turns on the transistor T1 during the time interval t1. The actuated transistor in turn grounds the non-inverting terminal 30 effectively via its emitter and collector electrodes. When this happens the amplifier 21 inverts the input as shown by the waveforms F, G, and H up to the time *t*1. When the ground is removed, as is the case between *t1* and *t*2, the DC potential at the non-inverting terminal is set by the resistors R3–R5 such that the encoder 29 does not invert its input. This is shown by the waveform H during the corresponding time interval.

The inverting terminal 31 is connected to a DC offset or bias circuitry 28 comprised of a transistor T2, resistors R7, R8 and R9 and a potentiometer P operatively connected as shown. The potentiometer P is used to adjust the level of current applied to the operational amplifier 21 from the −15 volts DC source via the base electrode of the transistor T2 then to the resistors R9, R1, and R5. The level of the offset voltage V which establishes the DC level of the output of the operational amplifier 29 is obtained by varying the potentiometer and thereby adjusting the amount of the current applied to operational amplifier. Resistors R1, R2, R3, R4, and R9 are adjusted to serve the function of matching the two oppositely directed output waves of the encoder 21 so that they have same maximum magnitudes. As usual the operational amplifier may be adjusted to provide a suitable level of gain while it inverts its input in the foregoing manner.

Figure 4:
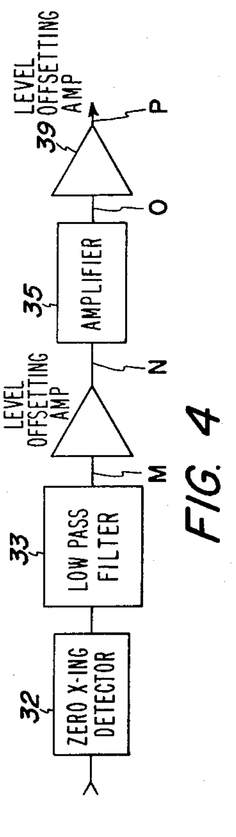
FIG. 4 shows an alternate analog decoding apparatus in a block diagram form.
Figure 5:
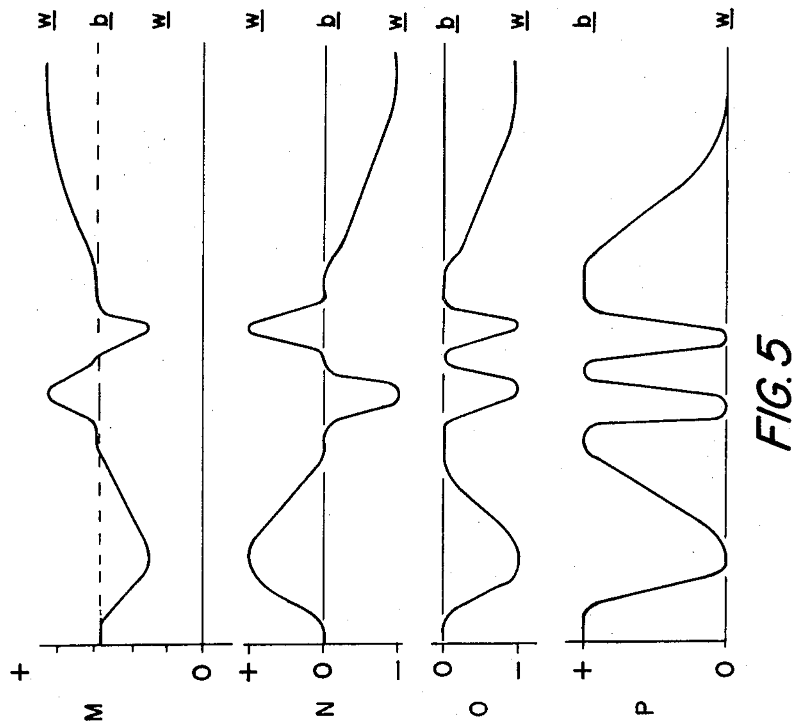
FIG. 5 shows waveforms at certain points in the decoding apparatus shown in FIG. 3.

As shown in FIGS. 4 and 5, the decoding process is essentially in the reverse order of the encoding process and is designed to recover the video signal as shown in the waveform A in FIG. 2. The signal arriving at the receiver is in the form of an FM pass band signal that has been subjected to some amount of distortion but which retains all of the essential quality of the signal content from the transmitter. The FM pass band signal is demodulated by means of a zero crossing detector circuitry 31. The output of the detector 32 is coupled to a low pass data recovery filter circuitry 33 which performs a smoothing or integrating function on the recovered three level signal and produce the three level waveform M as shown in FIG. 4. An offset amplifier 35 is used to shift the DC level of the three signal to be centered at 0 DC voltage. In addition, the offset amplifier is of a design that provides sufficient gain to cause the signal to have a maximum swing of a selected level of amplitudes as shown in the waveform N in FIG. 4. The output N of the offset amplifier 35 is then full wave rectified by a rectifying circuit 37 with the reference to the zero voltage representing the black threshold level signal *b* so that the three level in the signal of the waveform N is decoded to a two level signal in a negative voltage range as shown by the waveform 0. At this point, the two level signal waveform 0 recovers virtually all of the original analog signal including white, black and gray scale portions of the video signal. Another offset amplifier 39 is used to provide a DC offset to shift the recovered video signal so that the zero volts represent white threshold *w* and maximum positive amplitude waves represents black threshold level *b.* The resulting video signal is substantially a facsimile of the video input wave A in FIG. 2 transmitted after the encoding process. As shown the signal retains all of the gray scale analog signal as well as the black and white thresholds and includes sharply marked transition between black and white thresholds.

The particular encoding method and circuitry described above was used in a facsimile transmission system as disclosed in a copending application, (D/3851), filed contemporaneously. The present encoding scheme was effective in enabling the transmission system to increase the speed of transmission while providing a high degree of resolution in black/white transition. In addition it enabled the system to remove background noise and enhanced the over-all quality of the facsimile copy.

While the present invention has been described in terms of two-to-three analog encoding scheme, it is to be understood that its scope is not so limited. The teachings of the two-to-three level encoding scheme can be extended to encompass multi-level analog encoding, within the ambit of the present invention. Various other modifications may be made to suit particular needs. Thus, for example, while the aforementioned encoding scheme is illustrated in terms of the conversion of the black-white level signal to white-black-white level signals, if need warrants the encoding scheme can be modified to provide black-white-black output signals. Also if necessary the black threshold, not the white threshold, may be forced to the ground potential level after suitable inversion process. In addition, while the invention is illustrated in terms of a scheme which includes a clipping step, this is not necessarily essential in implementing the present invention. Thus, a train of two level analog input waves can be alternately inverted to provide a train of three or multi-level analog output waves by modifying the illustrated embodiments described above without clipping threshold levels or forcing them to a ground potential. Further modifications and changes may be made to methods and apparatus described above without departing from the teachings of the present invention as set forth in the following claims.

What is claimed is:

1. A two-to-three level encoder for compressing the frequency spectrum of an analog signal ranging between high and low amplitude levels while preserving intermediate amplitude information carried by said signal, said encoder comprising the combination of:

timing means responsive to high level-low level transistions of said analog signal for providing a first series of timing signals marking such transistions;

operational amplifier means coupled to receive said analog signal; and switch means coupled between said timing means and said operational amplifier means for alternately switching said operational amplifier means between an inverting mode and a non-inverting mode in response to alternate ones of said timing signals to thereby encode said analog signal without materially affecting any intermediate amplitude information carried thereby.

2. The encoder according to claim 1 further including means for clipping any portion of said analog signal exceeding a selected high level threshold amplitude.

3. The encoder according to claim 2 further including means for clamping any portion of said analog signal falling below a selected low level threshold amplitude to a predetermined reference potential to thereby reduce the effect of any background noise.

4. The encoder according to claim 3 wherein said analog signal is a video signal bearing facsimile information having high and low amplitude black and white information and intermediate level gray scale information, and said clamping means includes means for adjusting said low level threshold amplitude at a level to suppress any gray scale background noise carried by said video signal; and further including means responsive to alternate ones of said first series of timing signals for generating a second series of timing signals, and means for applying said second series of timing signals to said switch means.

5. The encoder according to claim 4 further including input means for peaking the maxima and the minima of said video signal.

6. The encoder according to claim 4 wherein said clamping means includes a passive impedance element for applying the video signal to said clipping means when the amplitude of the video signal exceeds said low-level threshold amplitude, and means connected in shunt with said passive impedance means for clamping any portion of said video signal falling below said low-level threshold to said predetermined reference potential.

7. The encoding apparatus according to claim 4 further including offsetting means responsive to the clamped video signal for for restoring the clamped video signal to a ground reference level.

* * * * *